United States Patent

Camenzind

[15] 3,663,223

[45] May 16, 1972

[54] PROCESS FOR MAKING INTEGRATED CIRCUIT MASKS

[72] Inventor: Hans R. Camenzind, Santa Clara, Calif.

[73] Assignee: Signetics Corporation, Sunnyvale, Calif.

[22] Filed: May 13, 1969

[21] Appl. No.: 824,197

[52] U.S. Cl. ....................96/36.2, 96/41

[51] Int. Cl. ....................G03c 5/00

[58] Field of Search ....................96/36.2, 41; 101/128.2

[56] References Cited

UNITED STATES PATENTS

| | | | |
|---|---|---|---|
| 1,781,834 | 11/1930 | D'Autremont | 101/128.2 |
| 2,576,491 | 11/1951 | Ulano | 101/128.2 |
| 2,972,533 | 2/1961 | Frankau et al. | 96/41 |
| 3,508,919 | 4/1970 | Reimer | 96/36.2 |

OTHER PUBLICATIONS

Parks: " How to Prepare Artwork for Printed Circuits," Repro Review, July 1962 p. 58, 60, 62, 64, 66

Ingraham: " Photolithographic Masks for Integrated and Thin Film Circuitry," SCP and Solid State Tech. Mar. 1965, p. 33, 34

Barrows et al., " Photography Speeds Printed Circuit Design," Electronics Apr. 7, 1961, pp. 102, 104– 105

IBM Technical Disclosure Bulletin Vol. 7, No. 7 Dec. 1964 pp. 628– 629

Ulano: Advertisement, SCP and Solid State Technology, April, 1966, p. 14

*Primary Examiner*—J. Travis Brown

*Assistant Examiner*—John Winkelman

*Attorney*—Flehr, Hohbach, Test, Albritton & Herbert

[57] ABSTRACT

Process for making a mask for integrated circuits in which a drawing is prepared of each standard pattern required in the circuit. A plurality of positive copies are prepared of each drawing with the number of positive copies being equal to the number of times the standard pattern is repeated in the integrated circuit. The positive copies are arranged on a sheet of substantially transparent dimensionally stable material and then secured in the desired positions. The non-standard parts are then drawn onto the sheet for interconnecting the standard patterns to provide a composite pattern for the integrated circuit. The composite pattern is then utilized for producing a negative of the pattern for the integrated circuit. The assembly consists of the substantially transparent, dimensionally stable sheet which has fastened thereto positive copies of the standard patterns with interconnecting circuitry drawn on the sheet.

1 Claims, 10 Drawing Figures

INVENTOR.
Hans R. Camenzind
BY Flehr, Hohbach, Test, Albritton & Herbert
Attorneys INVENTOR.
Hans R. Camenzind
BY Flehr, Hohbach, Test, Albritton & Herbert
Attorneys INVENTOR.
Hans R. Camenzind
BY Flehr, Hohbach, Test, Albritton & Herbert
Attorneys INVENTOR.
Hans R. Camenzind
BY Flehr, Hohbach, Test, Albritton & Herbert
Attorneys INVENTOR.
Hans R. Camenzind
BY Flehr, Hohbach, Test, Albritton & Herbert
Attorneys

PROCESS FOR MAKING INTEGRATED CIRCUIT MASKS

BACKGROUND OF THE INVENTION

In the making of integrated circuits, it has been the practice to prepare a large pen and ink drawing many times the scale of the integrated circuit and which has drawn thereon all of the standard patterns which are utilized in the integrated circuit as well as the interconnecting leads, bonding pads and the like. The preparation of such a drawing has required very extensive effort on the part of skilled draftsmen and also has required a long period of time. It has been difficult to make any substantial changes in such a drawing without changing the entire drawing. It was only after the drawing was completed that the mask could be made. There is, therefore, a need for a new and improved process for making masks for integrated circuits.

SUMMARY OF THE INVENTION AND OBJECTS

The process for making masks for integrated circuits consists of preparing a pen and ink drawing of each standard pattern required in the integrated circuit. A plurality of copies of the drawing are prepared, the number of copies being equal to the number of times that the standard pattern is repeated in the integrated circuit. The copies of the standard patterns are arranged on a substantially transparent, dimensionally stable sheet in the manner in which they are to appear in the integrated circuit. The copies are then secured to the sheet in the desired positions. The non-standard parts of the integrated circuit, such as interconnecting leads, are drawn onto the sheet for interconnecting the standard patterns so that there is provided a composite pattern for the integrated circuit. This sheet is then used to produce a copy of the integrated circuit on a sheet of dimensionally stable material.

The assembly which is utilized in the process consists of a sheet of substantially transparent, dimensionally stable material which has mounted thereon a plurality of copies of standard patterns which form the integrated circuit. The standard patterns are also formed of dimensionally stable, substantially transparent material. Additional elements are drawn on the sheet for interconnecting the standard patterns to provide the complete integrated circuit.

In general, it is the object of the invention to provide a process for making masks for integrated circuits which greatly reduces the time required for making the masks and which substantially reduces the costs for making the masks.

Another object of the invention is to provide a process of the above character which can be carried out in open light.

Another object of the invention is to provide a process of the above character which can be readily learned and utilized by relatively unskilled personnel.

Another object of the invention is to provide a process of the above character which is very versatile and which, in particular, permits changes to be readily made.

Additional objects and features of the invention will appear from the following description in which the preferred embodiments are set forth in detail in conjunction with the accompanying drawing.

DESCRIPTION OF THE PREFERRED EMBODIMENTS

Figure 1:
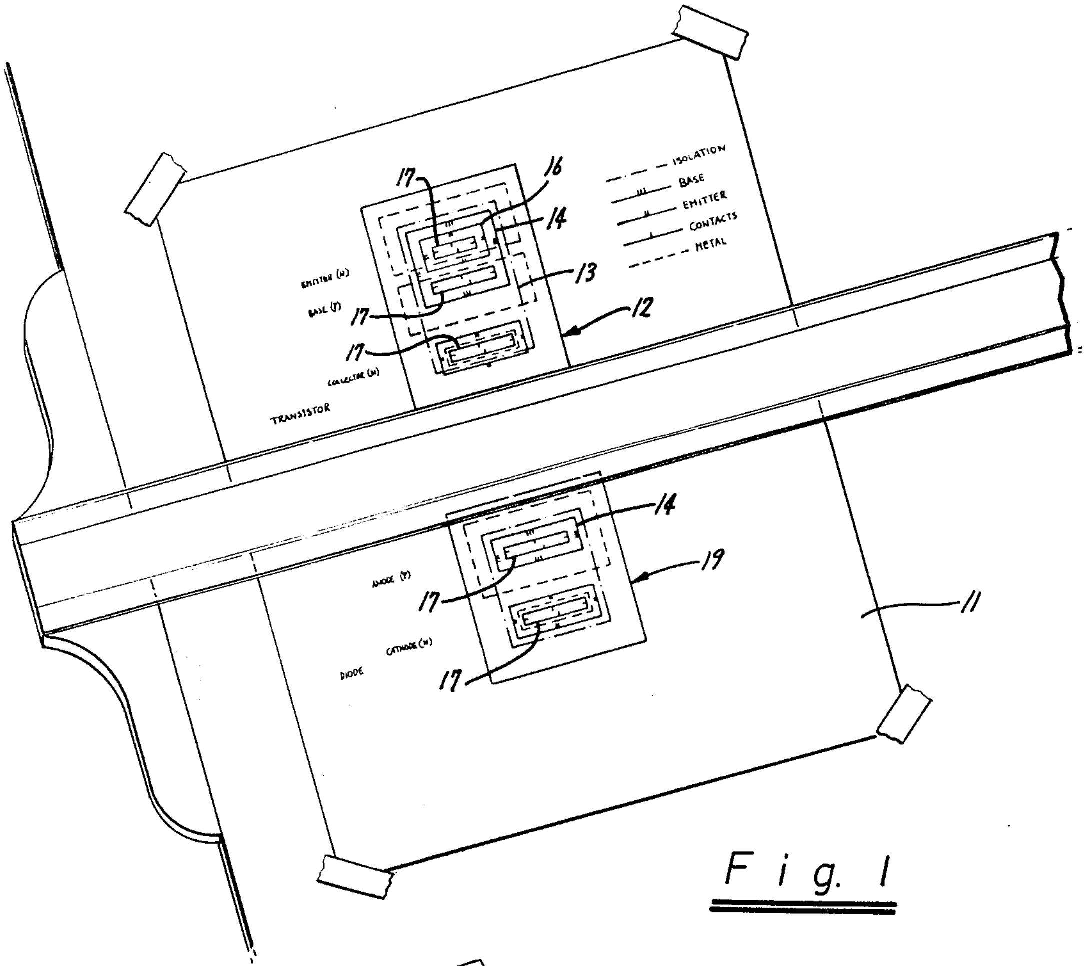
FIG. 1 is an isometric view of a drawing of the standard patterns utilized in a typical integrated circuit.

The process or method for making masks for integrated circuits is started by taking a sheet 11 of the suitable substantially transparent, dimensionally stable material, such as Mylar, and placing it on a drafting board as shown. The draftsman then makes a very accurate line drawing of each different semiconductor device which is to be utilized in the integrated circuit that is to be made. Thus, by way of an example, a transistor 12 is shown in FIG. 1. The transistor 12 is of conventional construction and typically consists of a dielectrically isolated transistor which has been provided with collector, base and emitter regions 13, 14 and 16 having the predetermined geometry such as rectangular as shown in FIG. 1. The lines which form these regions 13, 14 and 16 have been coded in the manner shown in the chart at the right of FIG. 1. The line 13 which defines the outline of the collector region also defines the line along which dielectric isolation is formed to isolate the transistor from the remainder of the semiconductor body in which it is to be formed. The pattern making up the transistor 12 also includes contact regions 17 which also are rectangular in geometry and in which one contact region is provided for each of the collector, base and emitter regions. These contacts regions are also identified by the code shown in the chart at the right of FIG. 1. The lines which form the collector, base and emitter regions define the areas through which impurities will be diffused into the semiconductor body to form the semiconductor device and in which regions of opposite conductivity are established within the body to form P-N junctions that are generally dish-shaped and extend to the surface. The manufacture of such devices is well known to those skilled in the art. The manufacture of semiconductor devices utilizing dielectric isolation is disclosed in application, Ser. No. 391,704, filed Aug. 24, 1964.

The transistor pattern shown in FIG. 1 also includes a region 18 which is adapted to receive metal to form a field plate in the manner described in application, Ser. No. 791,665, filed Jan. 16, 1969.

The patterns for diodes and other semiconductor devices would be formed in a similar manner by the draftsman utilizing black ink and forming outlines for the various regions in the manner in which the regions are formed in the transistor pattern 12. The regions would be coded in the similar manner to the transistor pattern 12 so that regions which would be diffused at the same time would be coded in the same manner. A diode 19 drawn in this manner is also shown in FIG. 1 in which the base region serves as the anode and the collector region as the cathode.

After all the patterns for all the different devices which are to be utilized in the integrated circuit have been completed by the draftsman, copies of the patterns for the devices are then made. This is accomplished by the use of a photosensitive material which will produce a negative of the image which is shown in FIG. 1. Such a step can be carried out with the conventional photographic techniques by the use of a darkroom. However, when it is desired to work with normal room lighting, a photosensitive material which only is sensitive to ultra-violet light can be utilized. One such material found to be particularly satisfactory is a product identified as "Color-Key" manufactured by the 3M Company. The "Color-Key"

product comes in sheets of different colors such as red, blue, green, brown and orange. The "Color-Key" sheets consists of a photosensitive film formed on a substantially transparent material such as a polyester base which is transparent and which is highly stable dimensionally.

Figure 2:
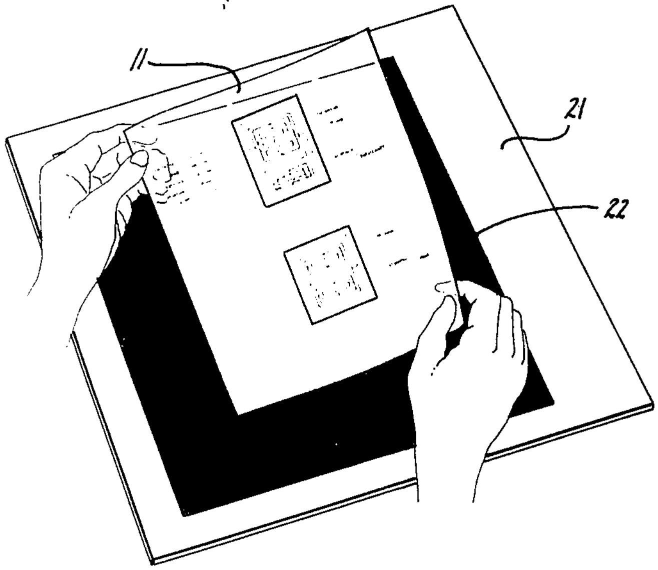
FIG. 2 is an isometric view showing the placement of the drawing in FIG. 1 on a "Color-Key" sheet so that the image can be transferred from the drawing to make a negative of the drawing.

The sheet 11 or any part thereof may be placed face down upon a light box or light table with a "Color-Key" sheet 22 over it. Such a table typically is covered with a frosted glass and which has below it a suitable source of ultra-violet light. One source found to be particularly convenient is a daylight fluorescent bulb which is placed below the glass. If shorter exposure times are desired, a studio type quartz floodlight can be used. A vacuum frame (not shown) is then placed on the light table over the drawing and the "Color-Key" sheet so that good contact is established between the original drawing and the "-Color-Key" sheet. Alternatively, a sheet 22 of orange "Color-Key" can be placed on a table 21 with the original sheet 11 placed over it as shown in FIG. 2. A glass plate 24 is placed over the sheet 11 to hold it in good contact with the sheet 22.

Figures 3, 4:
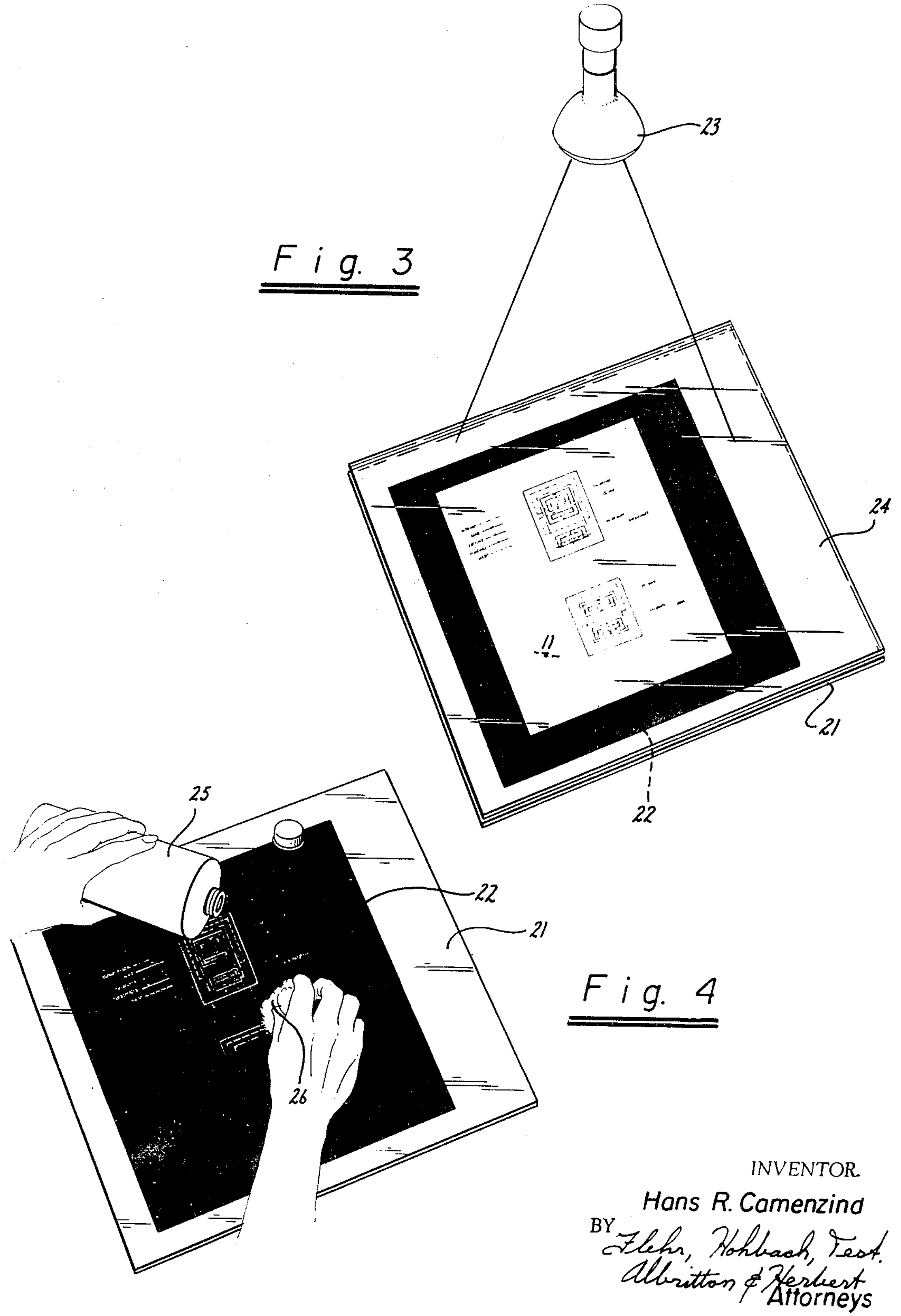
FIG. 3 is an isometric view showing the "Color-Key" sheet being exposed from a light source to form the negative.
FIG. 4 is an isometric view showing the development of the negative from the "Color-Key" sheet.

The "Color-Key" sheet is then exposed by shining the light from a fluorescent lamp 23 on the table 21 through the glass plate 24 and the drawing 11 onto the "Color-Key" sheet for a suitable period of time as, for example, 10 or 20 minutes as shown in FIG. 3. As soon as the exposure has been completed, the glass plate 24 is removed and then the "Color-Key" sheet 22 is developed by pouring a suitable developer such as a 3M brand "Color Key Negative-Acting Developer" supplied by the 3M Company from a bottle 25 onto the sheet 22 as shown in FIG. 4. The negative acting developer removes those areas of the photosensitive film which are not exposed to light.

A sponge 26 or other soft material such as a cotton wipe is utilized for rubbing the "Color-Key" sheet 22 to rub off the unexposed areas so that there remains a negative of the positive original which has been exposed. The negative "Color-Key" sheet can then be cut apart to provide the separate negatives of the patterns on sheet 11. The negative of each pattern is then utilized to make the desired number of positive copies. The number of positive copies of any one pattern is determined by the number of times that the pattern will appear in the integrated circuit which is to be formed. Thus, if the integrated circuit contains 10 transistors of the pattern shown in FIG. 1, 10 positives of the pattern would be produced.

The necessary positives are produced by placing another "-Color-Key" sheet 27, preferably orange in color, on the light table. The negative 22 is then placed over the "Color-Key" sheet 27 so that a good contact is established between the negative sheet 22 and the "Color-Key" sheet 27.

Figures 5, 6:
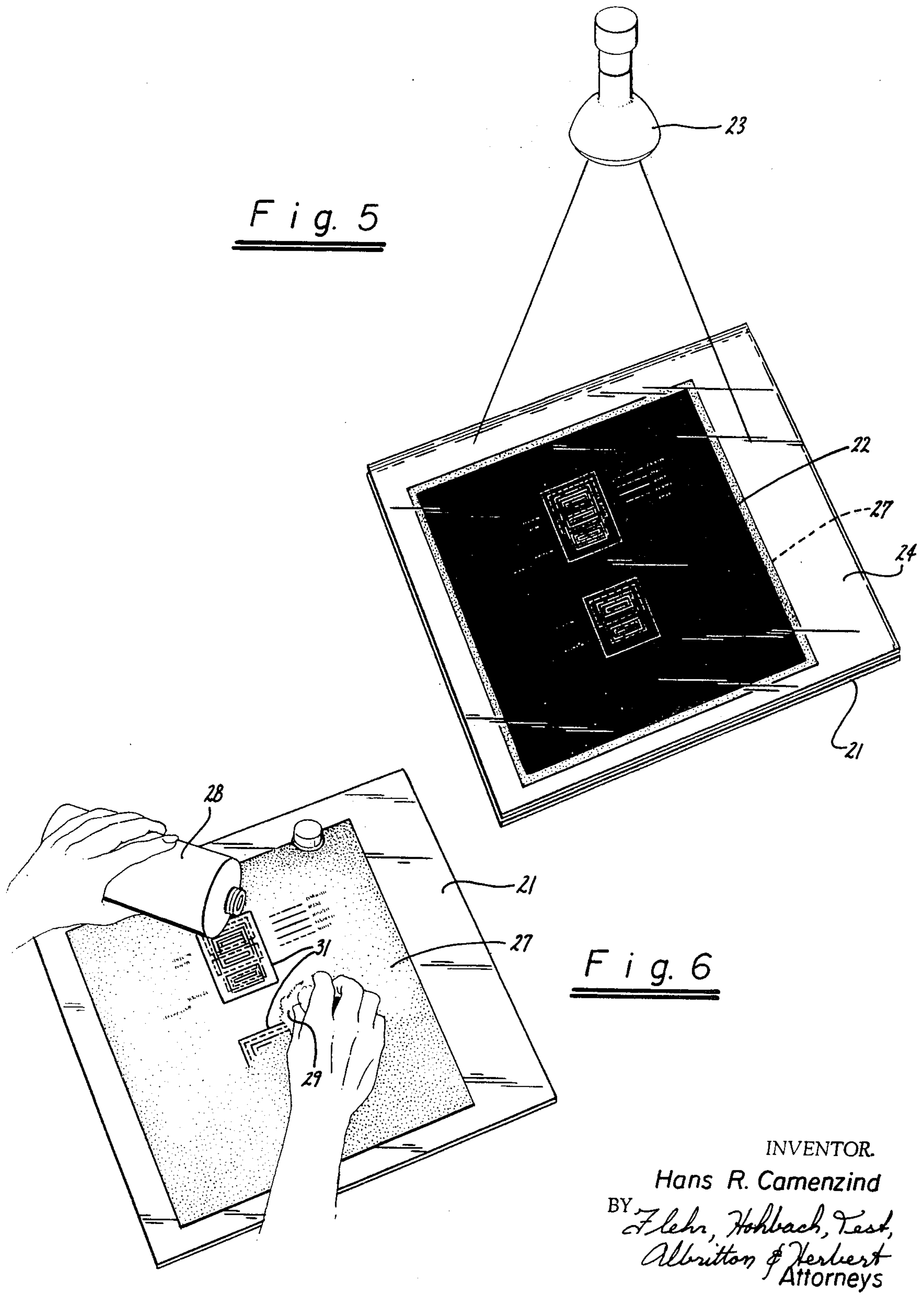
FIG. 5 is an isometric view showing the exposing of a negative "Color-Key" sheet from a negative "Color-Key" sheet to provide a positive.
FIG. 6 is an isometric view showing the development of the positive "Color-Key" sheet.

The "Color-Key" sheet 27 is exposed to ultra-violet from the source 23 for a suitable period of time, as shown in FIG. 5. As soon as the exposure has been completed, the "Color-Key" sheet 27 is developed by the use of a 3M brand "Color Key Negative-Acting Developer" from a bottle 28 A sponge 29 is utilized to remove the unexposed portions. This provides a positive on the "Color-Key" sheet 27 which is identical to the positive which appeared on the original sheet 11 containing the drawing. If it is desired to slightly alter the pattern which is utilized, this can be done by taking an eraser and removing the undesired portion from the negative sheet 22 and thereafter making the desired positive.

Figure 7:
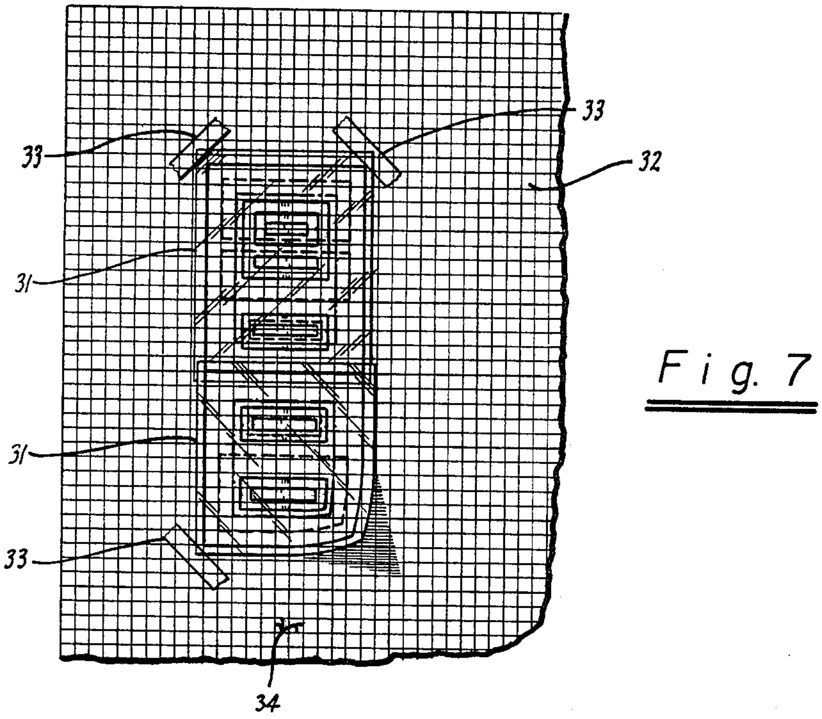
FIG. 7 is a top plan view showing the placement of patterns of the devices which are to make up the integrated circuit being placed upon a dimensionally stable sheet.

After all the necessary positives 31 have been formed which are to be utilized in the integrated circuit, a base sheet 32 (see FIG. 7) which is substantially transparent and which is dimensionally stable is placed on a suitable flat surface. The sheet 32 should be of a size so that it can accommodate the entire integrated circuit. The devices which are to form the integrated circuit are then positioned on the sheet 32 by taking the positives 31 which had previously been formed on sheets 27 and fastening them to the sheet 32 in their desired positions and holding them there by the use of strips 33 of a substantially transparent tape. In place of using the strips of tape 33, a transparent adhesive or other suitable material can be utilized for securing the patterns of the devices to the sheet 33. In order to facilitate the positioning of the patterns for the devices on the sheet 32, the sheet 32 can be provided with a grid 34 as shown in FIG. 7.

As soon as the first layout or assembly has been completed, the sheet with the patterns in the form of positives 31 secured thereto can be placed on a light table and a sheet (not shown) of blue-line (blue print) type is placed over the sheet 32 and exposed to ultra-violet light from the light table for a suitable period of time. The blue-line sheet is then processed in a conventional copying machine to develop the same. The blue-line is then taken and placed on a drafting board and the draftsman thereafter sketches in the interconnections 36 which are required to interconnect the various devices that make up the integrated circuit to determine whether or not the arrangement was satisfactory. If it is found that it is necessary to make some changes in the arrangement, the layout of the devices can be changed merely by removing the strips of tape 33 from the pattern or patterns which are to be removed and shifting them to the desired locations on the sheet 32. Another blue-line is then made of this arrangement and the interconnections are then drawn to see whether or not the arrangement is satisfactory. As soon as the final layout of the patterns has been decided upon the patterns 31 are precisely aligned with the grid lines 34 on the Mylar sheet 32 and held in position with the strips 33 of transparent tape.

Figure 8:
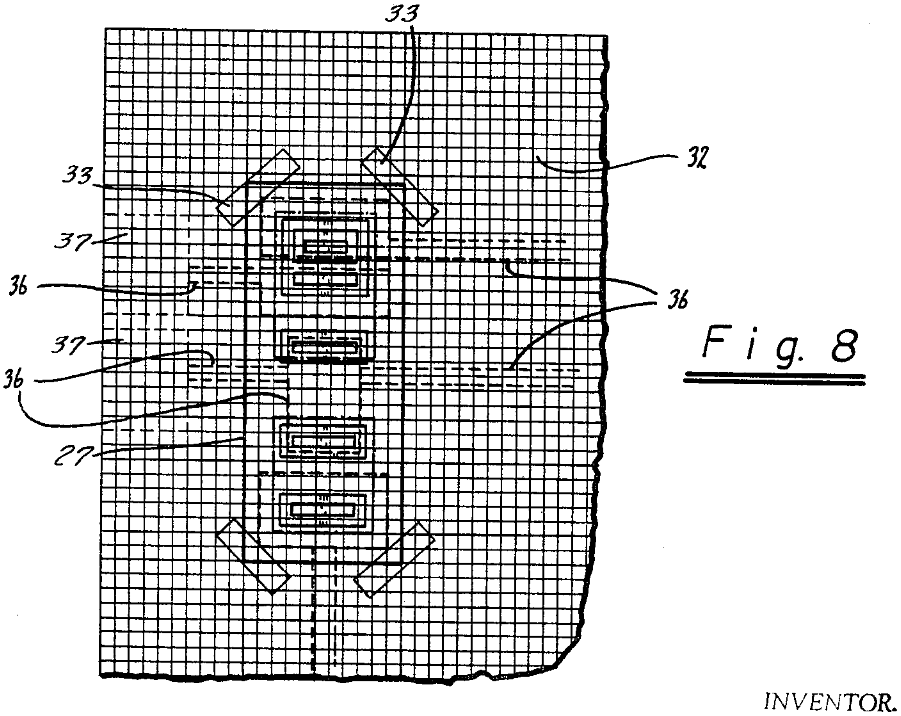
FIG. 8 is a top plan view similar to FIG. 7 but showing the interconnecting leads drawn on the dimensionally stable sheet which are utilized for interconnecting the devices of the integrated circuit to provide a composite assembly.

As soon as the placement of the positives 31 is completed, the necessary interconnections which are to be provided for interconnecting the devices are drawn directly on the sheet 32 to provide a plurality of interconnecting lead elements 36 and contact pads 37 as shown in FIG. 8. If it is desired to make modifications of the patterns for the devices, this can be readily accomplished by the use of an eraser and thereafter modifying the pattern by drawing in the modifications in black ink. In addition to forming interconnections between the devices of the integrated circuit, a scribe line 38 is drawn around the complete integrated circuit which will form the scribe line for the integrated circuit. This scribe line 38 can be the outer margin of the sheet 32 as shown.

As soon as the layout has been completed for the complete integrated circuit on the sheet 32, the sheet 32 again is placed on the light table and thereafter a large orange "Color-Key" sheet (not shown) is placed over the sheet 32 and a vacuum frame is placed over the same to establish good contact between the sheet 32 and the "Color-Key" sheet. The "Color-Key" sheet is then exposed to ultra-violet light for an appropriate period of time to cause the images carried by the sheet 32, including the grid lines 34, to be photographically imposed upon the "Color-Key" sheet.

Figure 9:
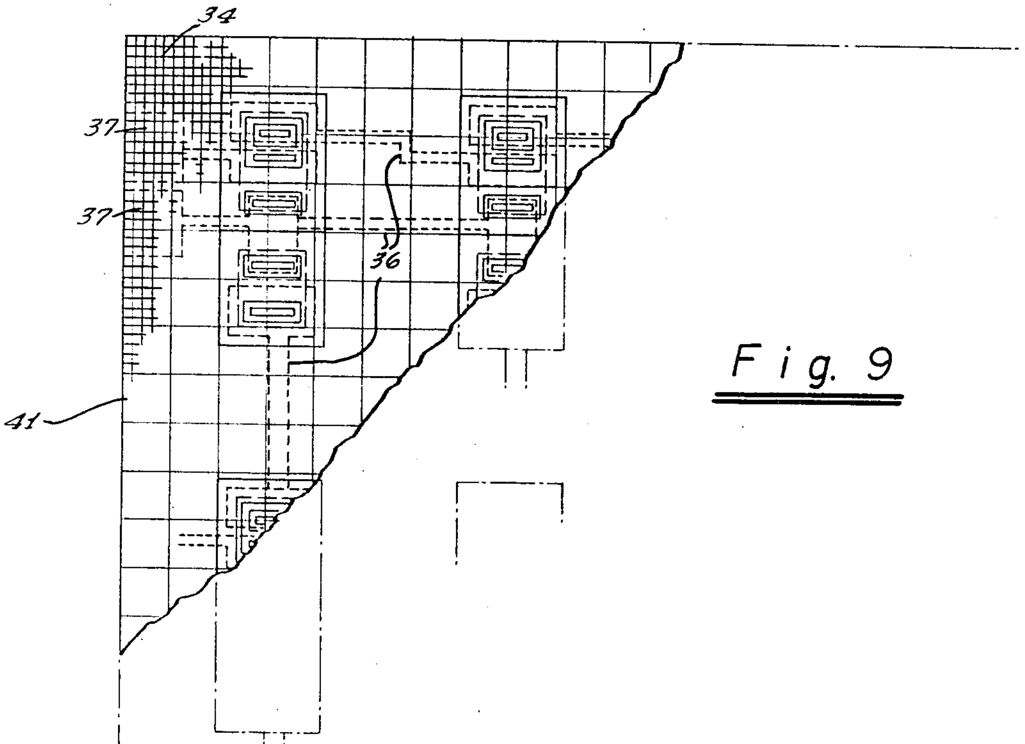
FIG. 9 is a positive which has been made from a negative that had been made from the composite assembly shown in FIG. 6.

After the exposure has been completed, the large "Color-Key" sheet is developed in the manner hereinbefore described to provide a negative of the complete pattern for the integrated circuit. In order to provide a positive of the complete integrated circuit, the negative "Color-Key" sheet is placed on the light table and thereafter, another "Color-Key" sheet 41 of a suitable color, such as black, is placed on the negative sheet and then a vacuum frame is placed over the same to establish a good contact between the two sheets. The sheet 41 is exposed and then developed in the manner hereinbefore described to provide a positive image of the pattern for the complete integrated circuit. This positive 41 carries all of the patterns of the integrated circuit including the grid lines 34 originally carried by the sheet 32 as shown in FIG. 9. The positive sheet 41 is preferably made of a color which makes a good contrast with Rubylith. Rubylith is a two layer polyester stripping film in which the base layer is transparent to all visible light and the stripping layer is transparent in a narrow band, i.e., to one color such as red or orange.

Figure 10:
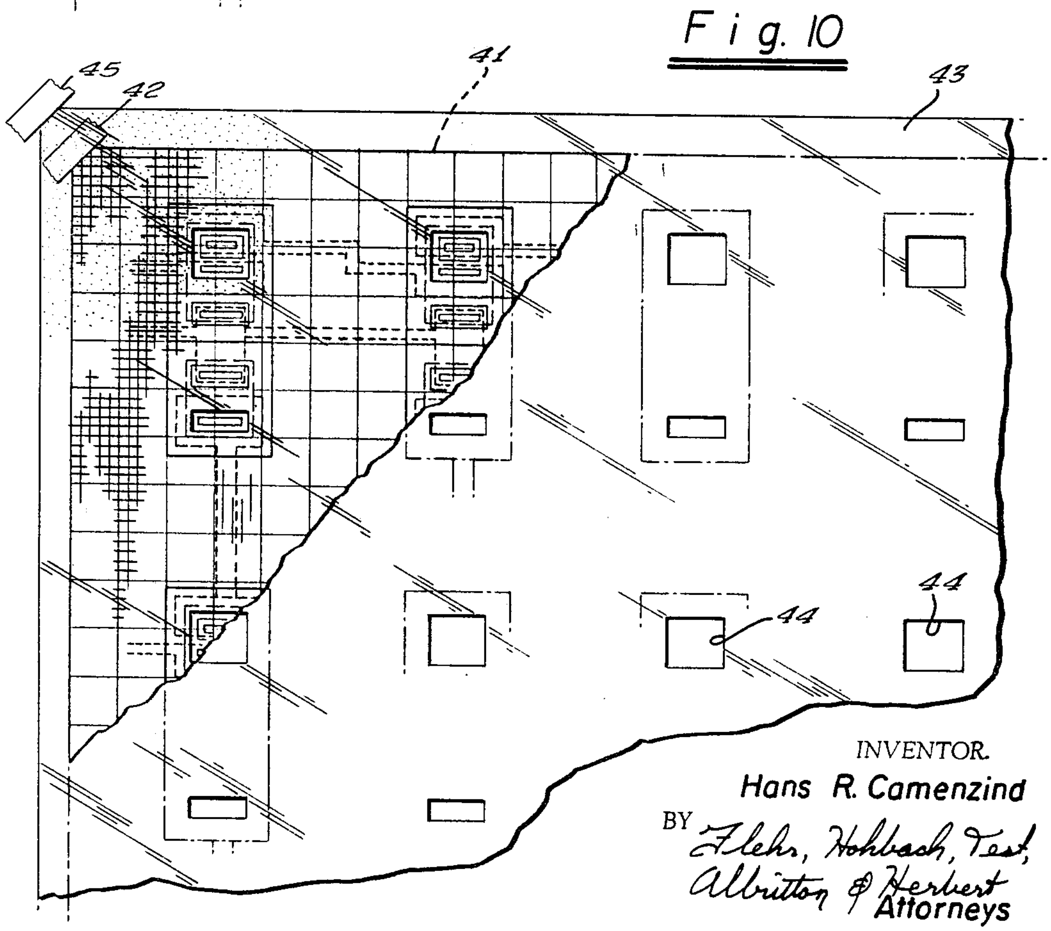
FIG. 10 shows the manner in which a Rubylith mask is made from the positive shown in FIG. 9.

As soon as the positive sheet 41 has been completed, it can serve as a master copy and can be placed on a light table and held in place by strips 42. Thereafter a red Rubylith sheet 43 is placed over the same and held in place by strips 45 as shown in FIG. 10. Portions of the Rubylith sheet are then cut away in accordance with the lines of the devices underlying the Rubylith sheet to provide openings 44. Thus, by way of example, the Rubylith for the first mask is made by viewing the sheet 41 on the light table and cutting out all of the material which is within the broken lines that represent the insulation regions 13. The material is cut away either manually or by a machine which is normally called a "Coordinatograph". The Rubylith sheet would have cut out of it all areas which would be formed at the same time in the integrated circuit. Thus, all of the insolation regions for the devices in the integrated circuit would be formed by the first mask. The Rubylith for the second mask would be formed by cutting another Rubylith sheet (not shown) along the base lines coded with the three perpendicular lines (not shown). The Rubylith for the third mask would be formed by cutting a third Rubylith sheet (not shown) along the emitter lines carrying the double perpendicular lines. In this way, Rubyliths can be formed for all five of the masks which are required for making the integrated circuit. The Rubyliths are then utilized for photographically making masks of the type which are to be utilized for making the integrated circuits by the use of conventional steps which will not be described in detail.

In carrying out the Rubylith cutting operations, it may be desirable prior thereto to run off a number of blue-line copies from the positive, and thereafter to shade or color the different sheets with the mask patterns which are to be formed to facilitate cutting of the Rubyliths for the masks.

It can be seen from the foregoing that there has been provided a process or a method which can be utilized for making masks for forming integrated circuits which saves a great deal of time and is much less expensive than methods which have heretofore been utilized. This is primarily true because the present method makes it unnecessary to duplicate on a drawing board the many similar devices which are utilized in an integrated circuit. The process is also advantageous in that it can be carried out without the use of a darkroom or a camera. It only requires the use of a light table and a vacuum frame. Also, it is advantageous in that the layout can be readily changed until the desired arrangement is achieved. Minor changes can be made by producing a new positive, erasing some of the lines and linking in new ones. For major changes, the original layout can be altered. In either case, an accurate copy of the original can be kept for later reference.

In the foregoing steps, it can be seen that from the positive which was originally drawn, a negative was produced and thereafter a positive. Thereafter, another negative and a positive are produced to provide the final sheet which is to be utilized for making the Rubyliths. The positive to negative to positive system has been utilized because it is possible to obtain greater definition. In addition, it has been found that the negative material has greater contrast and is more stable. However, if a positive type material is utilized in place of the negative type material, it can be seen that the steps which would be required for carrying out the present process would be reduced by a factor of 2 which would again further reduce the amount of time which would be required for carrying out the process.

Although the use of colors has been described in connection with the present method, it is possible to carry out the present method using only black and white.

I claim:

1. A method for making a plurality of masks for an integrated circuit comprising: (a) preparing a drawing of at least certain of the semiconductor devices required for making the integrated circuit said drawing bearing indicia thereon indicating opening outlines for each of said plurality of masks, (b) photographically preparing a negative of said drawing on a sheet of dimensionally stable, substantially transparent material using a room-light developable photocopying material, (c) photographically preparing on sheets of substantially transparent material by the use of and negative and said photocopying material a plurality of positive copies with the number of positive copies being equal to the number of times that the device is repeated in the integrated circuit, (d) arranging the positive copies on a base sheet of substantially transparent, dimensionally stable material and securing the copies to the base sheet in the desired positions, (e) providing a pattern of interconnections between the copies of the devices on the base sheet to provide a composite pattern for the integrated circuit (f) photographically producing a master copy of the composite pattern for the integrated circuit from the base sheet carrying the copies and the pattern of interconnections and (g) forming a plurality of separate masks utilizing said master copy and in accordance with the indicia carried by the master copy, said formation of a plurality of separate masks including the steps of placing a sheet of a two-layer stripping film over the master sheet, forming a pattern for one mask by cutting and stripping away portions of one layer of two-layer film in accordance with the indicia on said master sheet for said one mask and following the same procedure for the other masks.

* * * * *